United States Patent [19]

Appleby et al.

[11] 4,052,237

[45] Oct. 4, 1977

[54] CLOSED TORUS TIRE

[75] Inventors: Paul E. Appleby, Cuyahoga Falls; Stanley J. Houck, Akron; Richard B. Nash, Cuyahoga Falls, all of Ohio

[73] Assignee: The Goodyear Tire & Rubber Company, Akron, Ohio

[21] Appl. No.: 646,716

[22] Filed: Jan. 5, 1976

[51] Int. Cl.² ............ B29H 15/00; B29H 17/14
[52] U.S. Cl. .................. 156/117; 156/121; 156/124
[58] Field of Search ........... 156/110 R, 117, 118, 156/121, 122, 123 R, 130, 133, 157, 172, 195, 394, 397, 414, 415, 417, 431, 433, 446, 456, 457, 502, 503

[56] References Cited

U.S. PATENT DOCUMENTS

| 1,274,910 | 8/1918 | Lister | 156/118 |
|---|---|---|---|
| 1,385,220 | 7/1921 | Marquette | 156/122 |
| 2,915,102 | 12/1959 | Alexeff et al. | 156/117 |
| 3,057,396 | 10/1962 | Hanson | 156/117 |
| 3,245,853 | 4/1966 | Reinhart | 156/117 |
| 3,375,150 | 3/1968 | Alexeff | 156/117 |
| 3,392,072 | 7/1968 | Alderfer | 156/123 |
| 3,458,146 | 7/1969 | Warner | 156/117 |
| 3,606,921 | 9/1971 | Grawey | 156/117 |
| 3,613,762 | 10/1971 | Reinhart | 156/117 |
| 3,864,188 | 2/1975 | Grawey et al. | 156/117 |

*Primary Examiner*—Charles E. Van Horn
*Assistant Examiner*—John E. Kittle
*Attorney, Agent, or Firm*—F. W. Brunner; R. S. Washburn

[57] ABSTRACT

Method and apparatus for building a cord or wire wound carcass for a closed torus tire. An endless flattened inflatable tube providing a liner for the carcass and coaxially spaced bead rings are placed on a support comprising a cylindrical array of rolls. The bead rings are spaced axially to control the length of each turn of cord or wire wound in the flattened oval path around them. A single wire or cord is wound in a flat oval orbit about the liner and bead rings by orbiting a spool along a track having two straight parallel portions, one inside, the other outside the bead rings and liner. The parallel track portions are connected at their ends by semi-circular track portions. No rigid core is required. After winding the cord or wire about the liner and bead rings, the liner is inflated and the bead rings are shifted axially toward each other to the axial spacing appropriate for the inflated tire in use.

6 Claims, 7 Drawing Figures

CLOSED TORUS TIRE

The foregoing abstract is not to be taken as limiting the invention of this application, and in order to understand the full nature and extent of the technical disclosure of this application, reference must be made to the accompnaying drawing and the following detailed description.

The present invention relates to inflatable tires, particularly of the class of heavy duty tires requiring, in use, inflation pressures several times greater than the surrounding atmospheric pressure. Still more particularly it relates to a tire of the closed torus type wherein a reinforcement cord is wound continuously about the torus. Such tires are capable of sustaining inflation pressures independently of any wheel on which the tire may be mounted.

A notable disadvantage heretofore in building tires having continuously wound reinforcement cord of the closed torus type has been the need always to use a rigid core having an outside surface conforming to the desired inside shape of the inflation chamber of the tire which core had to be removed by way of the inflation inlet in the tire. In turn, this required a core which could be reduced to a fluent state for the purpose. Such cores have been constructed of material such as plaster of paris which can be dissolved in mild acids such as acetic and then washed out from the interior of the tire by way of the inflation inlet. Each such core is necessarily destroyed after the building of one tire.

An object of the invention, therefore, is a method and an apparatus for building a closed torus tire having continuously wound reinforcement cord without resort to a building core of any description.

Broadly, the invention comprises an apparatus for building a closed torus tire having continuously wound reinforcement cord and comprising cylinder support means for supporting a pair of endless bead cores in coaxial spaced apart relation and having an axially extending opening open radially and axially outwardly of the support means; and winding means constructed and arranged in said opening to wrap said reinforcing cord in a continuing flattened oval orbit about said bead cores crried on the support means.

Broadly, in accordance with the invention, the method comprises making a closed torus tire having continuously wound cord reinforcement and comprising disposing an endless flattened empty tube coaxially about a cylindrical support to form an inflatable liner; locating a pair of endless inextensible bead cores coaxially about said support each adjacent to a respective axial end of said tube, said cores being spaced axially apart a distance effective to determine the peripheral length of each single turn of cord wound continuously around said pair of cores; winding said cord continuously about said bead cores in a flattened oval path wherein said cord extends in substantially straight parallel lines respectively inwardly and outwardly adjacent to said cores while rotating said cores about the axis of said support in timed relation with said winding; then shifting each of said bead cores axially toward the other thereby relocating said cores relative to the periphery of the torus of cords therearound; and applying a breaker belt and tread circumferentially about the cord wound liner tube and said bead cores and curing the tire.

To acquaint persons skilled in the art with the principles and practice of the invention, certain preferred embodiments illustrating the best presently contemplated mode of practicing the invention will be described hereinbelow, making reference to the drawings which are a part of the specification and in which drawings.

Figure 1:
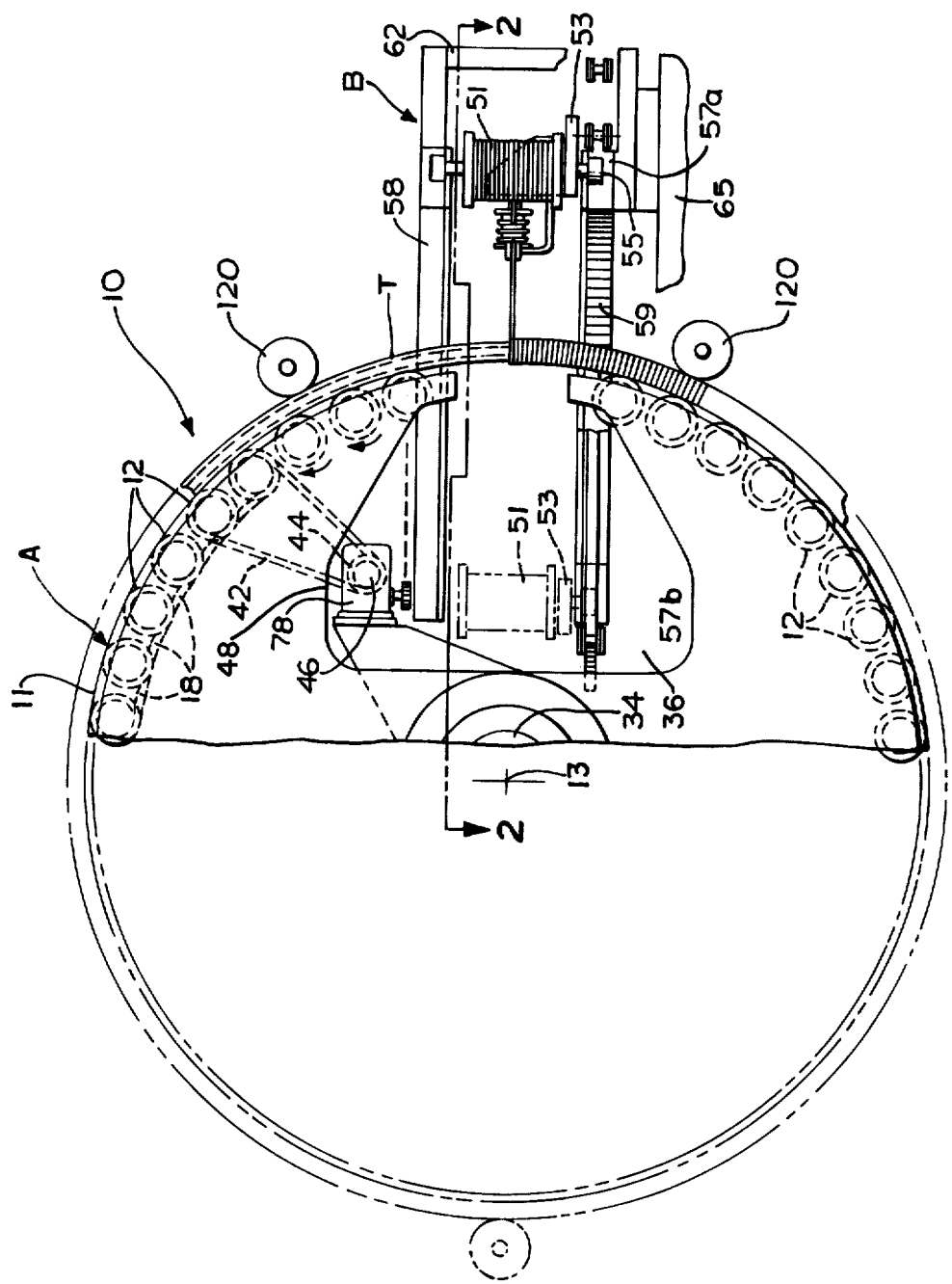
FIG. 1 is a schematic view, in axial end elevation, of an apparatus in accordance with the invention.
Figure 2:
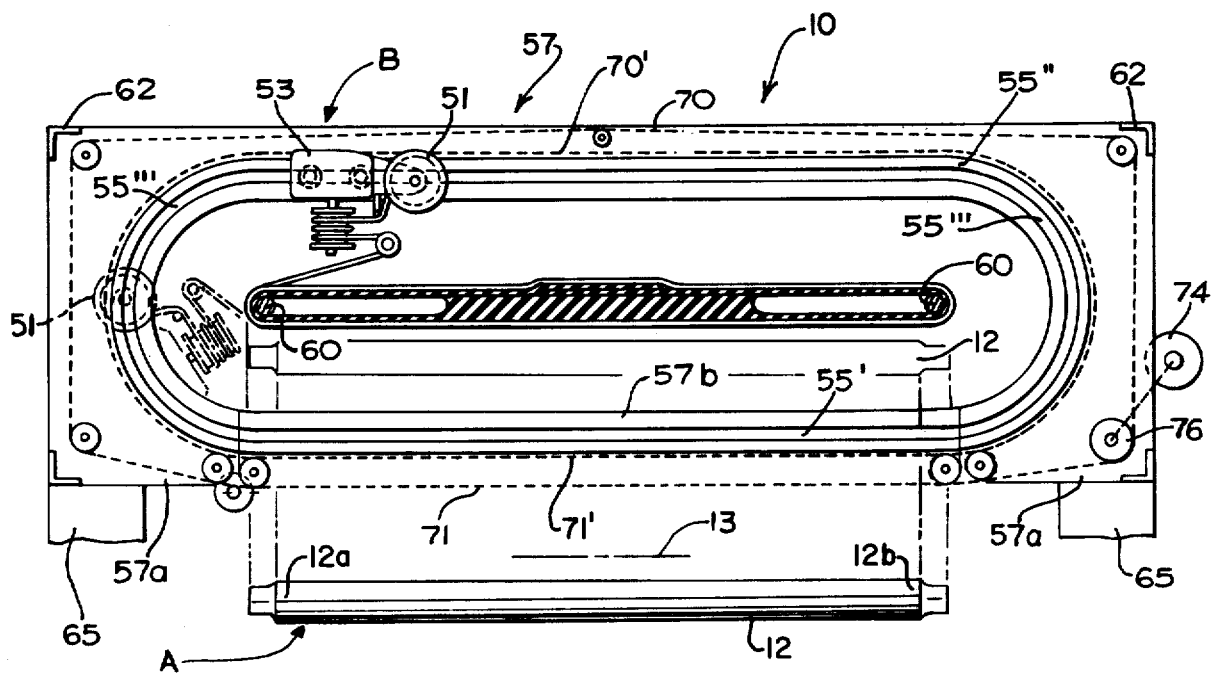
FIG. 2 is a schematic section view of the apparatus of FIG. 1, referred to the line 2—2 therein.

The apparatus 10, referring to the drawings and particularly to FIGS. 1 and 2, includes cylindrical support means A for supporting and for rotating a pair of bead cores and a tire liner in the form of an endless inflatable tube as well as cord winding means B for orbiting a cord spool in an axial plane of the support means normal to the respective bead cores. The support means and the winding means cooperate to wind a cord in a flat oval path about the bead cores and the tire liner tube carried on the support means.

In accordance with the invention, the cylindrical support means has a surface 11 provided by a circumferentially closely spaced array of rolls 12 extending parallel to the axis 13. Near each end 12a, 12b of each roll is a shoulder 14 formed by a circumferential groove or by a reduction of the diameter of the roll relative to its diameter between the shoulders. Inward of the respective shoulders each roll is grooved as at 16 to accommodate driving belts 18 which drivingly connect each roll respectively to one of its adjacent pair of rolls. The rolls are thus connected for rotation, each about its own axis at a common surface speed, that is, in mutually timed relation with each other. The grooves and belts are of such depth that the belt surfaces are approximately flush with the outward surfaces of the rolls.

Figure 3:
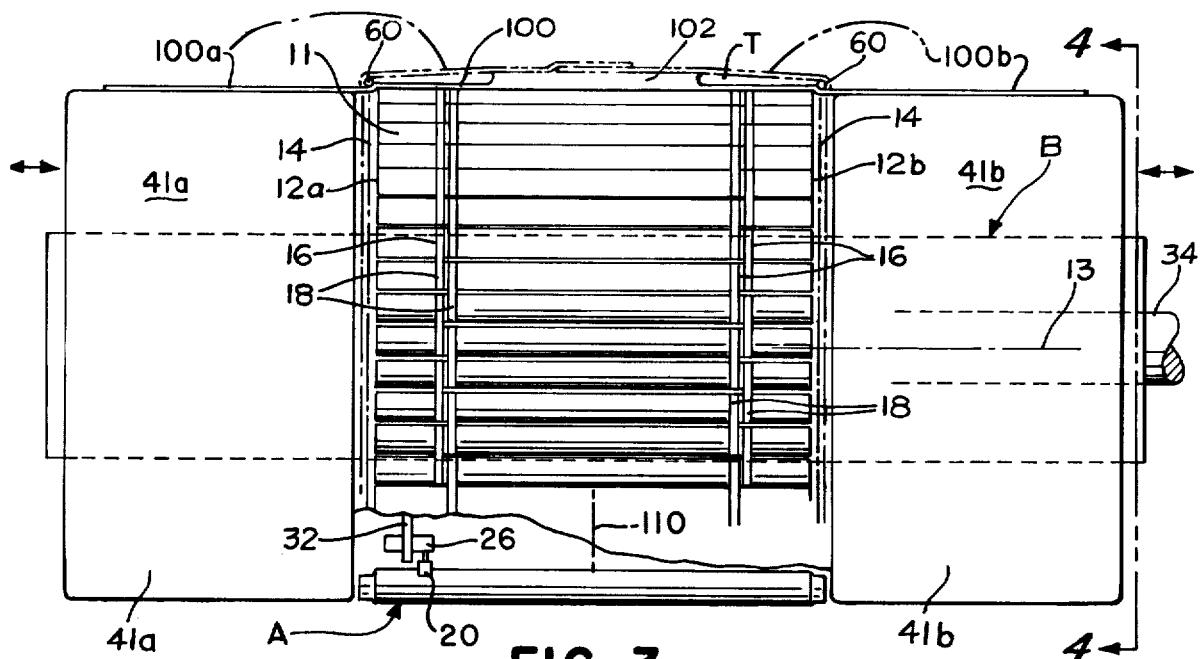
FIG. 3 is a schematic view, in elevation, of a part of the apparatus of FIG. 1.
Figure 4:
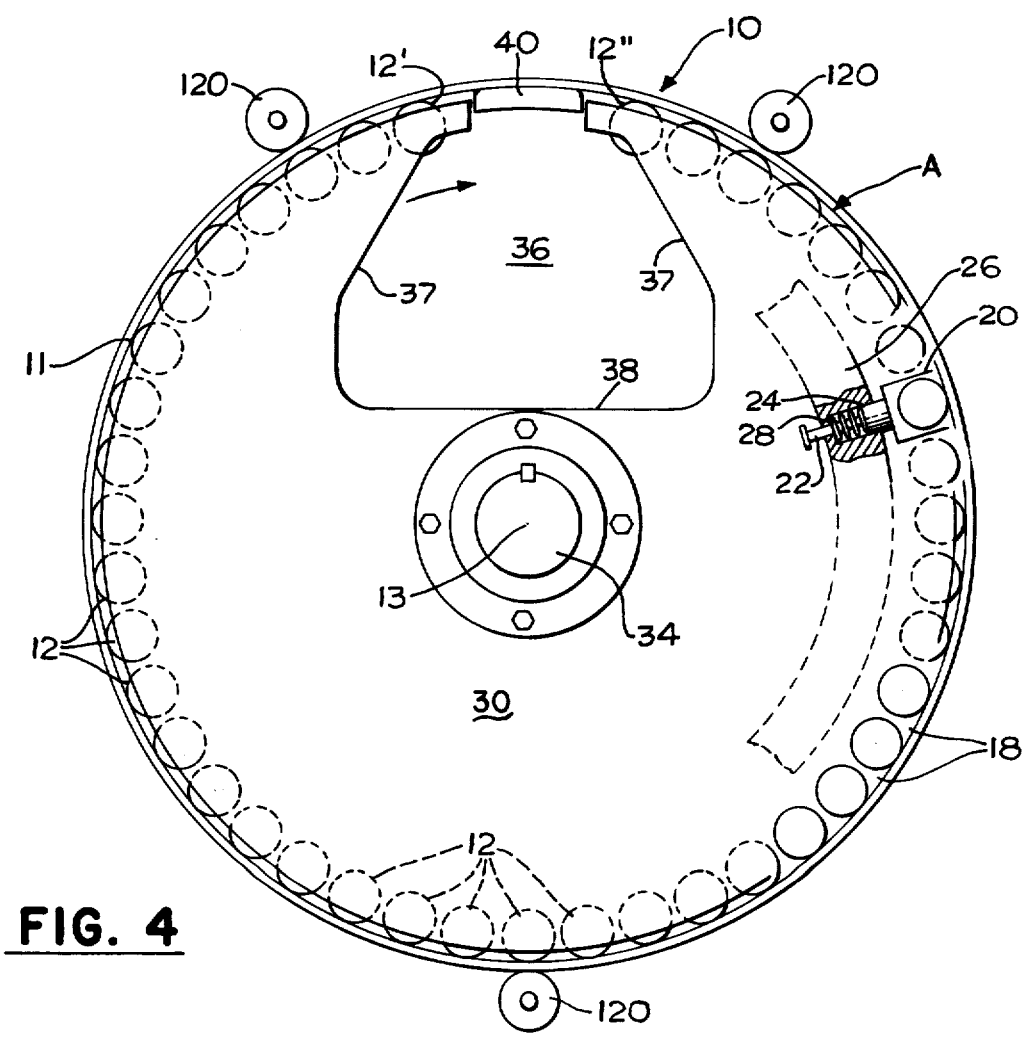
FIG. 4 is a schematic view of the apparatus of FIG. 1, referred to the line 4—4 in FIG. 3.

With reference also to FIGS. 3 and 4; each roll is mounted for rotation in a pair of axially spaced bearings 20 spaced angularly about the axis 13. Each bearing is fixed on a radially extending stud 22 which is slidable in a radial bore 24 in an annular ring 26. Each bearing and thus each roll is biased radially outwardly by a spring 28 or the like. The rings 26 are mounted, respectively, on the end plates 30,32 which are fixed corotatably and coaxially on a center shaft 34 carried in a pair of bearings (not shown) in a manner analogous to the support of a conventional tire building drum so that the support means can be rotated about its own axis 13.

To accommodate the winding means B, presently more fully described, an opening 36 extending axially of the support means, and opening outwardly radially of the axis as well as axially is defined by the edges 37 and 38 of a gap in each end plate between the rolls 12' and 12".

To provide cylindrical support across the opening 36, a displaceable section 40 axially coextensive with the rolls 12 and extending arcuately between the rolls 12' and 12" cooperates with the rolls in supporting a liner tube T disposed around the support means. This displaceable section can be provided with mechanism for its removal and replacement; in the present embodiment, it is removed and replaced manually.

Two side drums 41a, 41b each providing a coaxial extension of the surface provided by the rolls 12 are located close to the axial ends 12a and 12b, respectively. Each side drum can be removed so that the winding means B can move into the opening 36.

Two modes of rotation are provided by the support means. In the first, the support means is rotated as a unit about its own axis 13 while the rolls 12 are restrained from rotating about their own respective axes. In the second mode of rotation, and while the winding means B is disposed in the opening 36, the support means is not permitted to rotate about its own axis and the individual rolls each are rotated about their respective axes so as to rotate a pair of bead cores supported by the rolls relative to the opening and to the winding means disposed therein.

The first rotational mode is provided conventionally and facilitates disposing liner material in sheet form about the support means to form the liner tube.

In the second rotational mode the individual rolls are rotated in mutually timed relation by the belts 18. The rolls 12 are connected by a belt 42 looped about two adjacent rolls and about a corresponding pulley 44 on a jack shaft 46 mounted rotatably on the end plate 32. A brake 48 operates to prevent rotation of the individual rolls 12 during the first rotational mode and is arranged to be released when the jack shaft is connected, in the second rotational mode, to the winding means B.

The cord winding means B, referring again to FIGS. 1 and 2, includes a cord spool 51 and a spool carrier 53 mounted on the guide track 55 which provides an oval path about a pair of bead cores 60 carried on the rolls 12. The track 55 is formed in a guide frame 57 having two parallel side members 58,59 and spacer struts 62 extending therebetween. Each side member carries one rail of the track 55.

To provide for moving the guide frame relative to the opening 36 in the support means A, the frame 57 is divided into two parts 57a and 57b. The part 57b is mounted in the opening 36 of the support means and extends axially a small distance beyond each end 12a, 12b of the rolls. The part 57a is carried on slide ways 65 for movement radially of the axis 13, outwardly clear of the opening 36 and inwardly into register with the part 57b to form a unitary continuous closed guide frame and track. The spool carrier 53 is supported between the rails of the track 55.

The oval track 55 is formed of two portions each parallel to the axis of the support means when disposed in the operative position illustrated in FIG. 2. One portion 55' is disposed radially inwardly, the other 55" radially outwardly, of the cylinder 11 circumscribing the rolls 12. At their respective axial ends the parallel portions are connected one to the other by a substantially semi-circular portion 55'''.

It is also contemplated within the scope of the invention to arrange the guide frame and the track in two parts each movable toward and away from the other parallel to the axis 13 into and out of the opening 36.

To drive the spool carrier 53, spool carrier drive means are provided by a chain loop 70 disposed in part 57a and a chain loop 71 in part 57b. Each chain loop has an inner reach 70',71' which conforms to and slides relative to the associated track rail and an outer reach 70'',71'' carried by suitable sprockets mounted rotatably on the respective side memebers. The chain loop 70 in part 57a is carried on the side member 58 being offset perpendicularly with respect to the chain loop 71 in part 57b on the side member 59, permitting the respective loops to overlap along the track 55 so as to provide for disengagement and engagement of drive pawls (not shown) on the spool carrier. Transition of the drive pawls from loop 70 to loop 71 is thus provided enabling the spool carrier to be positively driven throughout its orbit about the bead cores. The chain loop 70 is driven by a motor 74 connected to the sprocket 76.

Each turn of cord about the bead cores is equally spaced circumferentially of the cores to provide a uniform pitch, which is the distance measured circumferentially from one turn to the next succeeding turn of cord. To time the relation between the orbital travel of the spool carrier and the rotational travel of the bead cores, the spool carrier drive means is connected by a gear box 78 to the jack shaft 46 and to the roll drive means when the guide frame is in the operating position illustrated in FIG. 2.

Alternatively, each of the chain loops and the jack shaft can be driven by individual electric drive means and the timed relation therebetween be provided by suitable conventional electric circuits.

According to the invention the method of making a cord wound tire having a closed torus inflation chamber begins by placing an endless flattened tube about a building surface to form an inflatable liner for the tire. Referring to FIG. 3, preferably liner stock 100 in sheet form is wound around the cylindrical surface provided by the rolls 12. A bead spacer element 102 is then laid circumferentially about the liner symmetrically of the mid-circumferential plane and adhered to the liner. The outward surfaces of the spacer and of the adjacent liner are then treated with an anti-tack agent such as a stearate. The two inextensible bead cores 60 of appropriate diameter are disposed coaxially in spaced relation with the liner on the support means.

The bead spacer element 102 is a strip of partially cured rubber compound which joins and becomes part of the liner of the tire. It can be of any suitable flexible material. As will presently be made clear, the spacer is to determine the axial spacing between the beads after the tire is wound and the beads moved from their spaced apart relation during the winding operation.

Figure 6:
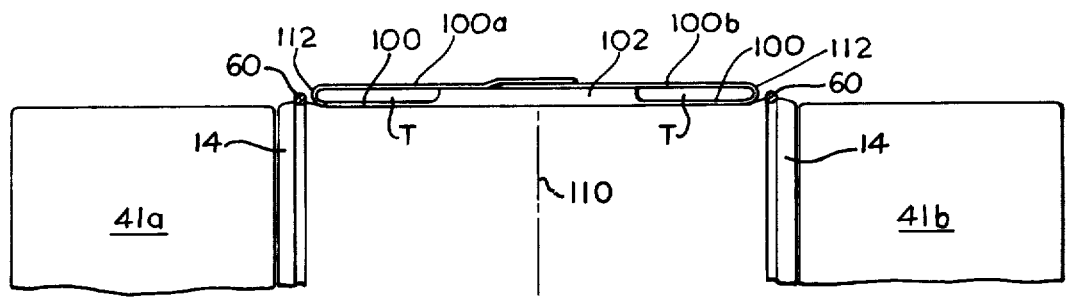
FIG. 6 is a partial elevational view of the apparatus of FIG. 1, illustrating a method in accordance with the invention.
Figure 5:
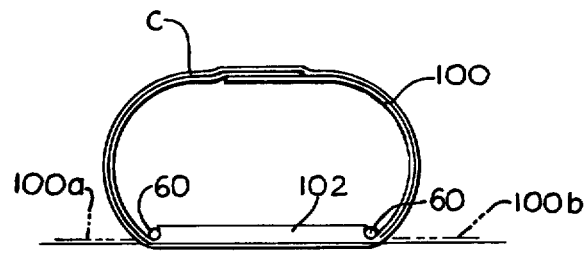
FIG. 5 is an axial cross-sectional view of a tire illustrating a method in accordance with the invention.
Figure 7:
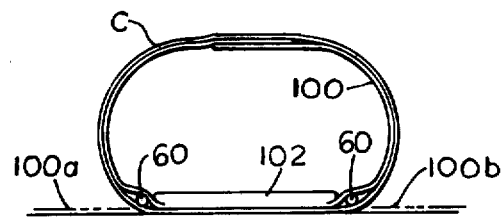
FIG. 7 is an axial cross-sectional view of a tire illustrating a method in accordance with the invention.

In the embodiment illustrated by FIGS. 3 and 5, the bead cores 60 are disposed about the liner 100 before the lateral portions 100a, 100b thereof are folded axially inwardly to form a circumferentially extending splice across the mid-circumferential plane 110. In a further embodiment illustrated by FIGS. 6 and 7 the lateral portions of the liner stock are folded axially inwardly to form a circumferentially extending lap splice across the mid-circumferential plane and the bead cores 60 are then located immediately adjacent the outward ends 112 of the thus formed liner tube. Comparing FIGS. 5 and 7, it will be noted in FIG. 5 that the bead cores are disposed within the tube chamber, inwardly of the liner and immediately adjacent the axial ends of the spacer. In the embodiment of FIG. 7, the bead cores will be seen to be disposed immediately outside the liner tube and close to the respective axial ends of the spacer but spaced from such ends by the thickness of the liner. In both cases it will also be noted that the bead cores are disposed within the torus formed by the wound cord.

In either case prior to shaping, the bead cores are spaced apart an axial distance which determines the length of a single turn of cord about the closed torus tire and are maintained in this spaced relation by the shoulders near the respective axial ends of the support rolls 12. As noted elsewhere herein the liner tube can be formed elsewhere and then placed on the support means.

A notable feature of the invention is that, by spacing the two bead cores apart by a distance determined by the length of one, and each, turn of cord about the torus, the need for a rigid disintegratable building core is eliminated.

The two bead cores are restrained by the roll shoulders 14 from moving toward one another due to the pull exerted by the cord being wound about them. The length of the cord in the flat oval path parallel to the axis and snugly turned about each bead core as seen in FIG. 3 is made equal to the predetermined length of the corresponding single turn of the cord desired in the shaped torus tire. Thus, the spacing of the bead cores, and of the shoulders 14, is determinative of the perimeter of the generatrix of the torus and of the, and each, single turn of cord of the tire.

To assist in maintaining the spacing between the bead cores, optionally, the control rolls 120 can be mounted for movement radially of the support means A to cooperate with one of the rolls 12 at each side of the opening 36. A third control roll 120 can in like manner cooperate with a roll 12 spaced 150° or more from the opening 36.

After the liner tube and the bead cores have been placed about the support means as described, the displaceable section 40 is removed so as to provide an axially extending space of arcuate width and radial depth sufficient to accommodate the cord winding means B, which is then moved into the operating position shown in FIGS. 1 and 2.

The free end of the cord to be wound is secured with respect to the tube, the spool of cord is made to orbit the section while the liner tube and the bead cores are moved circumferentially of their common axis in timed relation to orbital travel of the spool as it winds cord about the tube. In particular, the support means A herein is provided by a plurality of rollers 12 described and which rollers rotate to move the liner tube and beads circumferentially about the axis 13. The rate of circumferential movement of the liner tube and beads with respect to the rate of orbital travel of the spool is arranged to space the cords at a predetermined pitch of from about five to about 12 turns per inch of circumference measured at the bead cores.

Preferably, the individual rolls forming the building surface are arranged to be depressed radially relative to the building surface to accommodate a decrease in diameter, due to the increase in radial thickness, of the bead cores as the cord is wound therearound.

When the tube and bead cores have been rotated a single full revolution, 360°, the cord is cut and its end secured.

In accordance with a further notable aspect of the invention, the liner tube is then inflated so as to increase the radial height and decrease the axial width of the closed torus. The change of shape of the torus is accompanied by a shift of each of the bead cores axially toward the axial ends of the spacer as previously mentioned in connection with FIGS. 5 and 7. Alternatively, the beads may be moved axially inwardly toward the mid-circumferential plane of the tire manually or by other means after the cores in their axially spaced apart position, as shown in FIGS. 1 and 6 have served to determine the perimeter length of each turn of cord wrapped about the bead cores in the flattened oval state illustrated in the figures.

A breaker belt is then applied circumferentially about the torus and chamber. The belt can be applied either by winding running lengths of belt stock about the formed torus or in the form of an endless ring. Both steps are well known to persons skilled in the art. A tread is also applied circumferentially about the tire also by conventional procedures. The tire is then cured conventionally. A tire built in accordance with the invention has an inflation chamber capable by itself of retaining inflation pressure independently of the wheel on which the tire is mounted. Additionally, the inflation chamber is capable of retaining pressures several times the normal ambient atmospheric pressure without imposing undue stresses in the wheel on which it is mounted, particularly stresses likely to damage the flanges which locate the tire axially of the wheel.

The term, rubber, is used herein in its broad generic sense in common use, and will be understood to include any natural, synthetic, or combination thereof useful as rubber in the manufacture of tires. The term, cord, is likewise used herein in the broad generic sense in common use and will be understood to include any suitable linear filamentous reinforcing material suitable for reinforcing tires. Cord, herein, will include cotton, rayon, nylon, polyester, polyolefin, glass fiber, metal filament in poly or monofilament, twisted, doubled, stranded, or cabled form.

Torus, as the term is used in this specification, is to be understood as a surface, or the volume bounded by such surface which is generated by revolving any closed plane figure, called the generatrix, about an axis lying outside such figure and in the same plane.

A closed torus tire, as distinct from an open torus tire, will be understood in the present specification as describing a tire in which a reinforcing cord extends continuously about the surface generated in a spiral extending at least one full revolution of the generatrix. There is no opening radially inward such as is provided in the open torus, "open bellied" conventional tire.

While certain representative embodiments and details have been shown for the purpose of illustrating the invention, it will be apparent to those skilled in the art that various changes and modifications may be made therein without departing from the spirit or scope of the invention.

What is claimed is:

1. The method of making a closed torus tire having continuously wound cord reinforcement and comprising disposing an endless flattened empty tube coaxially about a cylindrical support to form an inflatable liner; locating a pair of inextensible endless bead cores coaxially about said support each adjacent to a respective axial end of said tube, said cores being spaced axially apart a distance effective to determine the peripheral length of each single turn of cord wound continuously around said pair of cores; winding said cord continuously about said bead cores in a flattened oval path wherein said cord extends in substantially straight parallel lines respectively inwardly and outwardly adjacent to said cores thereof while rotating said cores about the axis of said support in timed relation with said winding; then shifting each of said bead cores axially toward the other thereby relocating said cores relative to the periphery of the torus of cords therearound inflating said tube; and applying a breaker belt and tread circumferentially about the cord wound liner tube and said bead cores and curing the tire.

2. Method as claimed in claim 1, including placing a liner in sheet form about said cylindrical support and folding lateral portions thereof axially inwardly over the central portion thereof and lapping the edges of said lateral portions one on the other to form in said endless flattened empty tube a circumferentially extending lapped splice.

3. Method as claimed in claim 2 including disposing a bead spacer element circumferentially about said support and joining said element integrally to said liner, and treating the outward surface of said central portion to prevent adhesion thereto of said lateral portions.

4. Method as claimed in claim 1, comprising locating said bead cores circumferentially about said liner and folding lateral portions of said liner around the respectively associated bead cores to form said tube.

5. Method as claimed in claim 1, comprising folding lateral portions of said liner axially inwardly to form a circumferentially extending splice and then locating said bead cores adjacent to and axially outward of the respectively associated axial ends formed by said folding.

6. Method as claimed in claim 1, comprising shifting said bead cores by inflating said tube and the torus of cord thereon to increase the radial height and decrease the axial width of the closed torus thereby urging the bead cores toward each other.

* * * * *